Nov. 2, 1937.   G. C. MUNOZ ET AL   2,098,061
MOTOR SUPPORT
Filed July 10, 1935   2 Sheets-Sheet 1
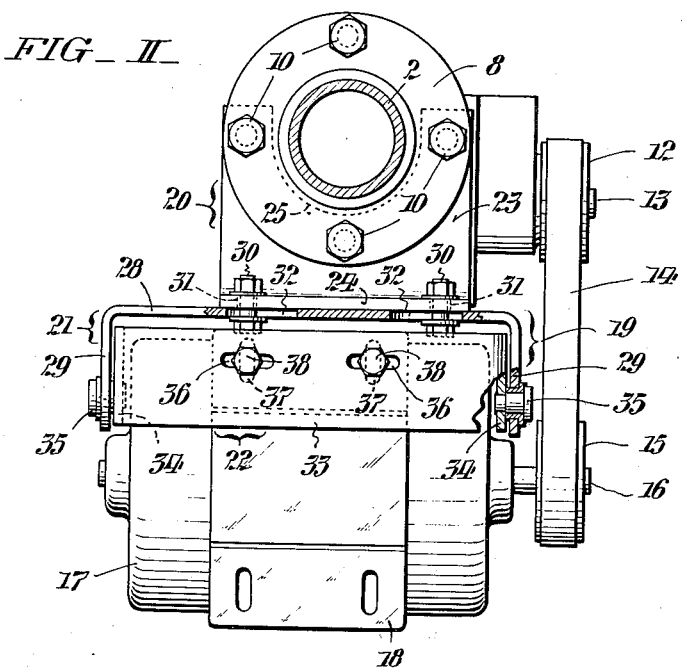
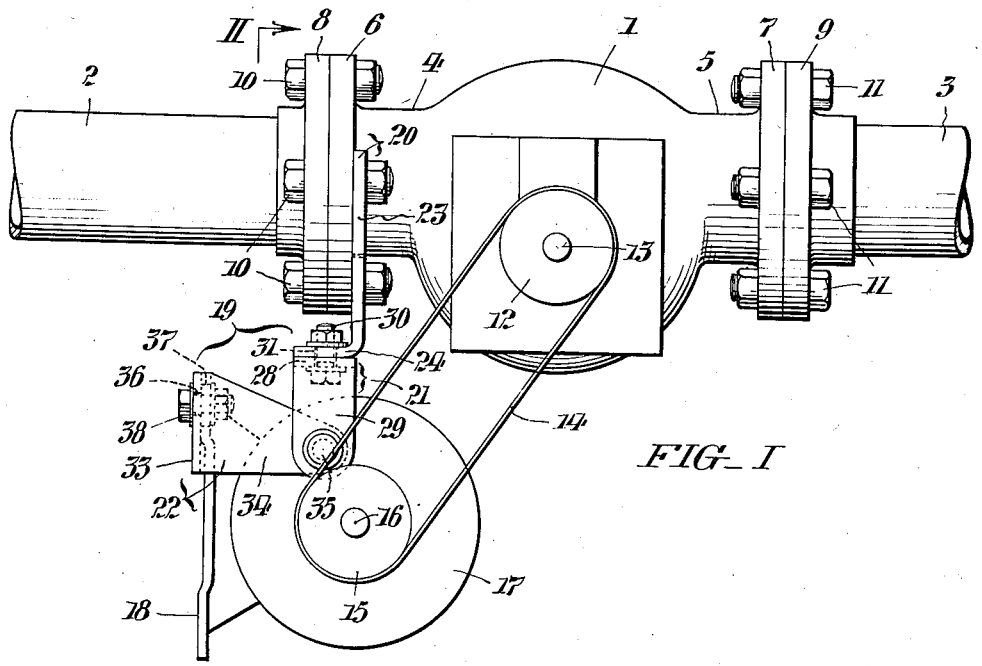
WITNESSES:
John C. Bergner
Hubert Fuchs
INVENTORS:
Gonzalo C. Munoz &
David M. Watson
BY
ATTORNEYS.

Nov. 2, 1937.   G. C. MUNOZ ET AL   2,098,061
MOTOR SUPPORT
Filed July 10, 1935   2 Sheets-Sheet 2
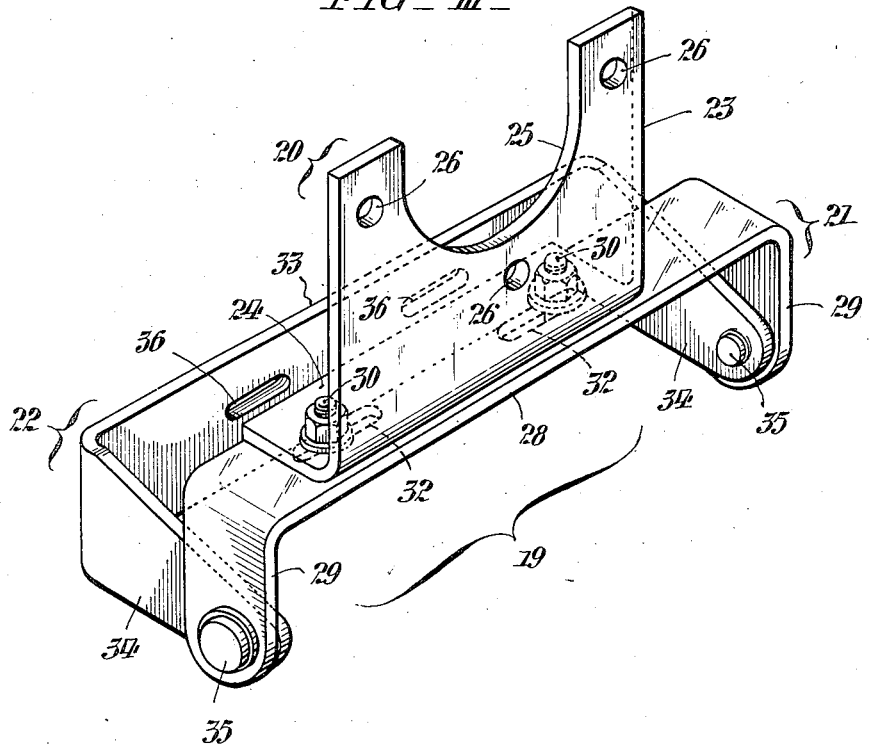
FIG. III
WITNESSES:
John C. Bergner
Hubert Fuchs
INVENTORS:
Gonzalo C. Munoz &
David M. Watson,
BY Fralley & Paul
ATTORNEYS.

Patented Nov. 2, 1937

2,098,061

UNITED STATES PATENT OFFICE 2,098,061

MOTOR SUPPORT

Gonzalo C. Munoz, Philadelphia, and David M. Watson, Ardsley, Pa., assignors to The American Pulley Company, Philadelphia, Pa., a corporation of Pennsylvania Application July 10, 1935, Serial No. 30,592

7 Claims. (Cl. 248—16)

This invention relates to motor supports, particularly supports for electric motors driving rotary pumps.

It is characteristic of electric motors that the frames of the motors tend to rotate oppositely to the motor shafts with a force equal to that being exerted by the motor pulley through a transmission belt at any given load. This tendency is known as "reaction torque" and varies in proportion to the load.

The aim of our invention is to provide a simple, inexpensive and durable support for the pivotal suspension of an electric motor from a rotary pump in such manner that the reaction torque is relied upon principally to automatically maintain a driving belt, coordinating pulleys respectively on the shafts of said motor and pump, under effective tension which increases in proportion to the load and vice versa, with avoidance of slippage and whipping of the belt.

In connection with a support having the above attributes, it is a further object of our invention to provide for both vertical and horizontal adjustment of the motor so that the pulley of the latter can be accurately aligned with the pump pulley, and to determine a definite initial tension for the belt as well as to compensate for the stretch of the belt as may be required from time to time.

One way in which the foregoing advantages may be readily realized in practice will appear from the detailed description following of the attached drawings, wherein Fig. I is a fragmentary view in side elevation, of a pipe line with an interposed rotary pump, and a support for the driving motor of the pump conveniently embodying our invention.

Fig. II is a section viewed as indicated by the arrows II—II in Fig. 1; and

Fig. III is a perspective view of the motor support alone.

With more detailed reference first to Figs. I and II of these illustrations, 1 designates a rotary pump which is interposed between aligned sections 2 and 3 of a horizontal pipe line. As shown, the inlet and outlet 4 and 5 of the pump casing are respectively provided with circumferential end flanges 6 and 7 which abut contiguous end flanges 8 and 9 on the pipe sections 2 and 3, the abutting pairs of flanges being secured together by bolts 10 and 11. A pulley 12 on the transverse actuating shaft 13 of the pump 1 is coordinated, by means of a belt 14 with a pulley 15 on the shaft 16 of a prime mover—in this instance an electric motor 17 which latter, after common practice, is provided with a flanged base 18.

The motor support with which the present invention is more especially concerned, is comprehensively designated by the numeral 19, and, as best known in Fig. III, comprises three components respectively numbered 20, 21 and 22 fashioned from stout sheet metal. The component 20 has the form of a bracket with a flat vertical portion 23 of a width corresponding to the diameter of the end flange 6 of the pump casing, and a relatively narrow bottom flange 24. The vertical portion 23 of the bracket 20 is cut away as at 25 to fit around the body of the pump 1, and provided with holes 26 (Fig. III) corresponding to holes in the flange 6 to the inner face of which it is secured by certain of the flange bolts 10 as shown in Figs. I and II.

The component 21 it will be observed, has the form of a vertical yoke with a transverse bar 28 and pendant side arms 29 overreaching the motor 17. Screw bolts 30 respectively passing through spaced circular holes 31 in the bottom flange 24 of the bracket 20 and registering longitudinal slots 32 in the cross bar 28 of the vertical yoke 21 serve to secure the latter to said bracket 20.

The other component 22 of the motor support has the form of a horizontal yoke, which, like the yoke 21, straddles the motor 17, said yoke 22 having a cross bar 33 and lateral arms 34 pivotally connected at their ends to the ends of pendant arms 29 of the yoke 21 by means of rivet studs 35. As shown, the cross bar 33 of the horizontal yoke 22 is provided with a pair of horizontal slots 36 to register with vertical slots 37 in the base flange 18 of the motor 17 for passage of securing bolts 38.

From the foregoing it will be apparent that we have provided a simple and inexpensive motor mounting which is easily attached to the rotary pump, and by which the motor is pivotally suspended for tensioning of the driving belt by the combined action of the reaction torque of the motor and gravitational influence upon the latter.

The described yoked construction favors location of the suspension pivot axis 35 within the confines of the motor close to the motor axis for obtainment of the maximum reaction effect, the suspension axis being, however, removed sufficiently so that as the motor swings, the distance between the pulley centers 13 and 16 increases enough to compensate for belt stretch and to vary the belt tension as the load changes. This automatic control of belt tension is thus proportional to the load. In other words, belt tension at no load automatically increases from a predetermined minimum to whatever tension is required up to and including peak loads. Under such conditions, the life of the belt and the bearings is increased with corresponding decrease in maintenance costs. Through provision of the vertical slots 37 for the bolts 38 in the base flange 18 of the motor 17, the latter can be adjusted up and down relative to the suspension pivot axis 35, with resultant increase or decrease in the weight leverage and predetermination of a definite initial belt tension. By the same provisions, it is possible to compensate for stretch in the belt 14 as may be required from time to time. On the other hand, accurate alignment as between the pulleys 12 and 16 may be secured by laterally adjusting the motor 17 on the horizontal yoke 22 as permitted by the bolt slots 36 in said yoke; or by adjusting the vertical yoke 21 laterally of the bracket 20 as permitted by the slots 32 in the bottom flange of said bracket.

While we have particularly shown and described our invention in connection with a rotary pump, it will be apparent that its application to other forms of driven devices or apparatus will be attended by advantages equal in all respects to those hereinbefore pointed out.

Having thus described our invention, we claim:

1. A pivotal suspension support for an electric motor having a pulley coordinated by a belt with the pulley of the device which is to be driven, comprising a fixed bracket; a vertical yoke secured to the bracket and having pendant arms overreaching the ends of the motor casing; and a horizontal yoke whereto the motor is secured, said horizontal yoke having side arms straddling the motor and pivotally connected at their ends to corresponding ends of the pendant arms of the vertical yoke.

2. A pivotal suspension support for an electric motor according to claim 1, wherein the horizontal yoke is adjustable longitudinally with respect to the bracket for the purpose of aligning the motor pulley with the pulley of the driven device.

3. A pivotal suspension support for an electric motor according to claim 1, wherein the motor is vertically adjustable on the horizontal yoke to take up stretch in the belt and to change the relation between the motor axis and the pivotal connections of the two yokes.

4. A pivotal suspension support for an electric motor having a pulley coordinated by a belt with the drive pulley of a rotary pump provided with end flanges and secured by bolts to correspondingly-flanged pipe sections, said support comprising a number of components whereof one is in the form of an apertured bracket so that it can be secured to the pump by means of the flange bolts, and whereof the others are capable of adjustment relative to each other, to the bracket and to the motor for the purposes of taking up stretch in the belt, aligning the motor pulley with the pump pulley, and changing the relation between the pivotal suspension axis and the axis of the motor.

5. A pivotal suspension support for an electric motor having a pulley coordinated by a belt with a drive pulley of a rotary pump formed with end flanges and secured by means of bolts to correspondingly flanged pipe sections, said support comprising an apertured bracket adapted to be secured to the pump by means of the flange bolts; a vertical yoke secured to the bracket and having pendant arms overreaching the ends of the motor casing; and a horizontal yoke whereto the motor is secured, having arms which straddle the motor casing and which are pivotally connected at their ends to corresponding ends of the arms of the vertical yoke.

6. A pivotal suspension support for an electric motor in accordance with claim 5, wherein the two yokes are adjustable relative to the bracket and the motor for the purposes of taking up stretch of the belt, aligning the motor pulley with the pump pulley, and changing the relation between the pivotal connections of the two yokes and the motor axis.

7. A pivotal suspension support for an electric motor having a pulley coordinated by a belt with the pulley of the device which is to be driven, comprising a fixed bracket; a yoke adjustably secured to the bracket and having arms overreaching the motor casing; and a second yoke supporting the motor with capacity for adjustment and movable relative to the first mentioned yoke, said second yoke having arms straddling the motor and pivotally connected at their ends to corresponding ends of the arms of said first mentioned yoke.

GONZALO C. MUNOZ.
DAVID M. WATSON.